United States Patent
Dow

(10) Patent No.: US 11,015,524 B2
(45) Date of Patent: May 25, 2021

(54) TURBINE ENGINE AIR CONTROL VALVE

(71) Applicant: Parker-Hannifin Corporation, Cleveland, OH (US)

(72) Inventor: Steven C. Dow, Fountain Valley, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 376 days.

(21) Appl. No.: 16/108,756

(22) Filed: Aug. 22, 2018

(65) Prior Publication Data

US 2019/0145315 A1 May 16, 2019

Related U.S. Application Data

(60) Provisional application No. 62/551,829, filed on Aug. 30, 2017.

(51) Int. Cl.
| | |
|---|---|
| *F02C 7/18* | (2006.01) |
| *F02C 7/057* | (2006.01) |
| *F01D 11/24* | (2006.01) |
| *F16K 1/226* | (2006.01) |
| *F02C 9/18* | (2006.01) |
| *F02K 3/06* | (2006.01) |

(52) U.S. Cl.
CPC ............ *F02C 7/057* (2013.01); *F01D 11/24* (2013.01); *F02C 7/18* (2013.01); *F02C 9/18* (2013.01); *F02K 3/06* (2013.01); *F16K 1/2261* (2013.01); *F05D 2240/55* (2013.01)

(58) Field of Classification Search
CPC ..... F16K 3/04–08; F02D 9/1015; F02D 9/102
See application file for complete search history.

(56) References Cited

U.S. PATENT DOCUMENTS

| | | | |
|---|---|---|---|
| 3,586,290 A * | 6/1971 | Null | F16K 1/2261 251/306 |
| 3,970,253 A | 7/1976 | Burkes et al. | |
| 4,452,395 A | 6/1984 | Kelly et al. | |
| 5,553,830 A * | 9/1996 | Stary | F16K 1/222 251/214 |
| 6,910,851 B2 | 6/2005 | Franconi et al. | |
| 7,168,682 B2 * | 1/2007 | Nanba | F02M 26/70 251/305 |
| 7,624,716 B2 | 12/2009 | Bessho et al. | |
| 8,091,862 B2 | 1/2012 | Palin et al. | |
| 8,528,880 B2 | 9/2013 | LaBenz et al. | |

(Continued)

*Primary Examiner* — Gerald L Sung
*Assistant Examiner* — Rene D Ford
(74) *Attorney, Agent, or Firm* — Renner, Otto, Boisselle & Sklar, LLP

(57) ABSTRACT

A turbine engine air control valve including a valve body having a fluid flow passage and a valve member disposed in the valve body. The valve member is configured to rotate about a rotation axis between a maximum flow position and a minimum flow position. The valve member includes a vane and a floating member operatively coupled to the vane. The floating member is configured to float relative to the vane, such that when the valve member is in the minimum flow position, the floating member is spaced apart from the valve body to form an annular flow gap that provides a controlled amount of minimum fluid flow across the valve member as the fluid flows through the annular flow gap.

18 Claims, 7 Drawing Sheets

(56) References Cited

U.S. PATENT DOCUMENTS

| | | |
|---|---|---|
| 9,133,960 B2 | 9/2015 | Lucas et al. |
| 2006/0163516 A1* | 7/2006 | Dreisilker .............. B64D 13/02 |
| | | 251/305 |
| 2011/0155939 A1* | 6/2011 | Casillas ................. F16K 1/222 |
| | | 251/305 |
| 2013/0283762 A1* | 10/2013 | Simpson ................ F01D 17/26 |
| | | 60/39.23 |
| 2017/0167273 A1 | 6/2017 | Maguire et al. |
| 2017/0328278 A1 | 11/2017 | Hussain et al. |

* cited by examiner

TURBINE ENGINE AIR CONTROL VALVE

RELATED APPLICATIONS

This application claims the benefit of U.S. Provisional Application No. 62/551,829 filed Aug. 30, 2017, which is hereby incorporated herein by reference.

FIELD OF INVENTION

The present invention relates generally to a valve, such as an air control valve, and more particularly to a butterfly-style air control valve for providing cooling flow in gas turbine engines, such as for use in aerospace applications.

BACKGROUND

A gas turbine engine may be used to power various types of systems and vehicles, such as aircraft. A typical gas turbine engine may include a fan section, a compressor section, a combustor section, a turbine section, and an exhaust section.

The fan section is positioned at the inlet of the engine and includes a fan that induces air from the surrounding environment into the engine, and accelerates a portion of this air toward the compressor section. The remaining air induced into the fan section is accelerated into and through a bypass plenum, and out the exhaust section.

The compressor section compresses the air received from the fan section and raises the pressure to a relatively high level. The compressed air from the compressor section then enters the combustor section, where fuel nozzles inject fuel that is subsequently ignited. This high-energy compressed air from the combustor section then flows into and through the turbine section, which causes the turbine blades to rotate and generate energy. The air exiting the turbine section is exhausted from the engine via the exhaust section, which combines with the bypass air to generate thrust.

Typically the turbine section will include a plurality of turbines, such as a high pressure turbine, an intermediate pressure turbine, and a low pressure turbine. Each turbine is mounted within a turbine case, and the rotor blades in each turbine extend radially outwardly from its associated spool, and are surrounded by, and spaced apart from, an annular liner that is attached to the turbine case. This provides a radial clearance gap between the turbine blade tips and the annular liner. The size of the radial gap will affect the amount of air leakage past the rotor blades, which can affect turbine performance because turbine efficiency decreases as fluid leakage past the turbine blades increases.

During a typical gas turbine engine operating cycle, rotational speed and temperature variations within the turbine may result in variations of the radial clearance between the blades and the annular liner. For example, an operating condition that typically results in the smallest radial clearance between the blades and annular liner occurs when the gas turbine engine is quickly brought up to full power, such as during take-off. In this scenario, the turbine blades heat up rapidly and thermally expand. In addition, the turbine's rotational speed increases, subjecting the blades to centrifugal forces that may cause radial blade growth. At the same time, the annular liner, and the turbine case that supports it, may both heat up rapidly and thermally expand radially outwardly. However, during other operating conditions, such as when the aircraft is cruising at high-altitude, the gas turbine engine is typically operated at a lower power condition whereby the rotor blades cool and thermally contract. In this scenario, the radial clearance between the turbine blade tips and the annular liner may increase, which may result in undesirable leakage and concomitantly low engine efficiency.

To mitigate these effects, modern gas turbine engines frequently employ turbine case cooling (TCC) to maintain a desired gap between the rotating turbine rotor blade tips and the annular turbine rotor liner. In conventional TCC systems, cooling air is supplied to the turbine case to control thermal expansion of the turbine case. An example of such TCC systems uses one or more air control valves, such as butterfly valve(s), that are disposed between the engine bypass section and the turbine case. These butterfly valve(s) are utilized to modulate the amount of low-temperature bypass air that is allowed to cool the turbine case, which can thereby control the thermal expansion of the turbine case and hence the radial clearance with the turbine blade tips. For example, during take-off or maneuvering, the butterfly valve(s) will remain closed so that no cooling air interacts with the turbine case, thereby causing the case to expand to accommodate for the concomitant expansion of the rotor blades and to maintain the radial clearance between the turbine case and the turbine blade tips. On the other hand, when the aircraft is operating at low-power demands, such as during cruising, the butterfly valve(s) may selectively be opened so that cooling air interacts with the turbine case, thereby causing the turbine case to contract to accommodate for the concomitant contraction of the rotor blades. Such active clearance control, in which the butterfly valve(s) are selectively opened or closed to modulate cooling air flow to control expansion of the turbine case, can therefore result in improved efficiency across multiple phases of engine operation.

SUMMARY OF INVENTION

One problem with such turbine case cooling systems of the type described above is that components such as the annular turbine case liner may wear over the service life of the aircraft engine, which will cause the radial clearance between the liner and rotor blade tips to change over time. This makes it more difficult to control the amount of cooling air desired to control expansion and maintain a desired clearance gap. More particularly, as the radial clearance between the rotor blade tips and turbine case liner increases due to wear over time, it may be desirable to provide a controlled amount of cooling flow to the turbine case that allows the case to contract toward the rotor blade tips even when the turbine section is at elevated temperatures due to the engine being at full-power; otherwise inefficiencies may occur due to the larger than desirable radial clearance caused by service wear.

The problem with the traditional butterfly valves of the type described above, however, is that they are optimized for providing a desired amount of cooling flow for new engine builds with known clearance gaps, and thus are configured to completely eliminate cooling flow when they are fully closed for the reasons discussed above. Thus, by eliminating cooling flow in the closed or minimum flow position, these traditional air control valves allow the worn turbine case to heat up and expand beyond an acceptable level, thereby causing engine inefficiency for such older service engines.

The present invention provides a turbine engine air control valve that is configured to provide a controlled amount of fluid flow even when the valve is in its minimum flow position. More particularly, the air control valve may have a rotatable valve member including a vane and a floating member operatively coupled to the vane, in which the floating member is configured to float relative to the vane, such that when the valve member is in the minimum flow position, the floating member is spaced apart from an internal surface of the valve body to form an annular flow gap that provides a controlled amount of minimum fluid flow across the valve member as the fluid flows through the annular flow gap.

Providing a controlled amount of minimum flow in this way allows some cooling air to interact with the turbine case even when the valve is in the minimum flow position, which can help to maintain a suitable radial clearance gap between the rotor blades and turbine case liner in the event of wear between these components over the life of the engine. In addition, such a configuration allows the valve to have a small annular gap without confining the vane position. Beneficially, flow through the valve at the minimum flow position can be fine-tuned at time of assembly. Such a design also could allow for retrofit of existing sealed valve designs, such as in the case of turbine case cooling valves of the type described above, where a controlled flow when closed is used to extend engine life and maintain lower specific fuel consumption (SFC).

According to one aspect of the invention, a turbine engine air control valve includes: a valve body having a fluid flow passage; a valve member disposed in the valve body, the valve member being configured to rotate about a rotation axis between a maximum flow position and a minimum flow position; wherein the valve member includes a vane and a floating member operatively coupled to the vane; and wherein the floating member is configured to float relative to the vane, such that when the valve member is in the minimum flow position, the floating member is spaced apart from the valve body to form an annular flow gap that provides a controlled amount of minimum fluid flow across the valve member as the fluid flows through the annular flow gap.

Embodiments may include one or more of the following additional features, alone or in any combination.

The vane may be configured as a disc-shaped plate.

The air control valve may be configured as a butterfly valve and the vane may be configured as a butterfly plate.

The vane may have a circumferential edge having a circumferential groove, and the floating member may include an annular ring disposed in the circumferential groove.

The annular ring may include a split or gap; or the annular ring may include a plurality of discrete segments circumferentially disposed about the vane.

The valve member may further include a resilient member radially interposed between the floating member and the vane, in which the resilient member is configured to engage the floating member to restrict movement of the floating member relative to the vane.

The resilient member may be a centering spring, such as a wave spring, a marcel spring, or another suitable spring.

The valve member may further include one or more coupling members configured to floatably couple the floating member to the vane, in which the one or more coupling members are configured to restrict radially outward movement of the floating member to prevent the floating member from engaging the valve body.

The one or more coupling members may each include a pin extending through the vane and into an elongated slot of the floating member.

The elongated slot of the floating member may be radially or circumferentially elongated.

The valve member may be configured to modulate the flow of air through the fluid flow passage based on an angular position of the valve member within the flow passage.

The fluid flow passage may extend along a longitudinal axis, and the valve member may be rotated to extend toward a direction parallel to the longitudinal axis in the maximum flow position; and the valve member may be rotated to extend toward a direction perpendicular to the longitudinal axis in the minimum flow position.

The air control valve may further include a rotatable shaft extending through the valve body, in which the valve member is secured to the rotatable shaft so that rotation of the shaft causes the valve member to rotate about the rotation axis between the maximum flow position and the minimum flow position.

The rotation axis of the valve member may be a first rotation axis, and the rotatable shaft may be inclined to a plane perpendicular to a longitudinal axis of the valve body, such that the rotatable shaft is rotatable about a second axis that is different from the first axis.

According to another aspect of the invention, an airflow control system for a gas turbine engine includes: an airflow supply passage configured to convey air therethrough; a butterfly valve operatively disposed in the airflow supply passage, the butterfly valve including: a valve body having a fluid flow passage that defines at least a portion of the airflow supply passage; a rotatable shaft extending through the valve body; a valve member disposed in the valve body and secured to the rotatable shaft such that rotation of the shaft causes the valve member to rotate about a rotation axis between a maximum flow position and a minimum flow position; wherein the valve member includes a vane and a floating member operatively coupled to the vane; and wherein the floating member is configured to float relative to the vane, such that when the valve member is in the minimum flow position, the floating member is spaced apart from the valve body to form an annular flow gap that provides a controlled amount of minimum fluid flow across the valve member as the fluid flows through the annular flow gap; the airflow control system further including an actuator operatively coupled to the rotatable shaft for selectively rotating the valve member between the maximum and minimum flow positions.

Embodiments may include one or more of the following additional features, alone or in any combination.

The airflow control system may further include a position sensor having an output signal associated with an angular position of the valve member in the valve body.

The airflow control system may further include a controller operatively coupled to the position sensor and to the actuator.

The controller may be configured to receive the output signal from the position sensor and may be configured to control the actuator to rotate the rotatable shaft and thereby the valve member to a selected position between the maximum and minimum flow positions.

The valve body may have an upstream inlet opening and a downstream outlet opening, the valve member being disposed in the valve body between the inlet and outlet openings.

The airflow supply passage may have an upstream portion upstream of the inlet opening of the valve body, the upstream portion being in fluid communication with a bypass flow passage of an aircraft engine.

The airflow supply passage may have a downstream portion downstream of the outlet opening of the valve body, the downstream portion being in fluid communication with a turbine section of the aircraft engine.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects of the present invention have particular application to turbine engine air control valves, such as for use in controlling cooling airflow for aircraft engines or ground based engines, and thus will be described below chiefly in this context. It is also understood, however, that the principles and aspects of this invention may be applicable to valve assemblies for other applications in which it is desirable to provide a controlled amount of fluid flow when the valve is in a minimum flow position.

Figure 1:
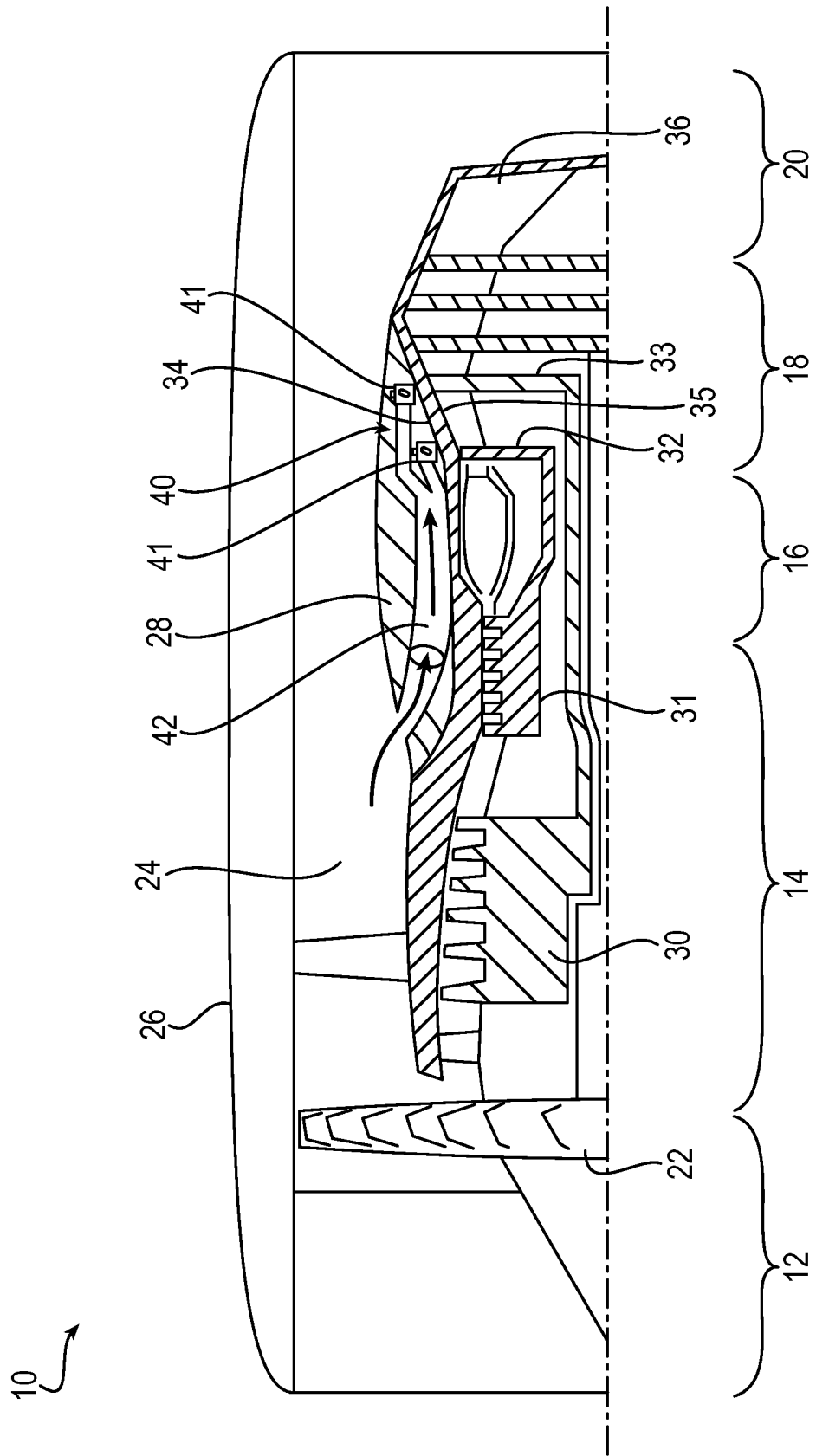
FIG. 1 is a partial cross-sectional schematic side view of an exemplary gas turbine engine including an exemplary airflow control system according to an embodiment of the present invention.

Referring to FIG. 1, a partial cross-sectional schematic view of an exemplary gas turbine aircraft engine 10 is shown. The gas turbine engine 10 generally includes an intake section 12, a compressor section 14, a combustion section 16, a turbine section 18, and an exhaust section 20.

The intake section 12 includes a fan 22, which draws air into the intake section 12 and accelerates some of this air toward the compressor section 14. The remaining air induced into the intake section 12 is accelerated into and through a bypass section 24 having a plenum formed between a fan case 26 and an engine cowl 28. The air flows through the bypass section 24 and then out of the exhaust section 20 to provide forward thrust.

The compressor section 14 compresses the air received from the intake section 12 and increases the pressure of the air to a relatively high level. In the illustrated embodiment, the compressor section 14 includes two compressors, including an intermediate pressure compressor 30, and a high pressure compressor 31. The intermediate pressure compressor 30 increases the pressure of the air received from the intake section 12, and directs this compressed air into the high pressure compressor 31. The high pressure compressor 31 compresses the air even further relative to the intermediate compressor, and directs the high-pressure air into the combustion section 16. In the combustion section 16, the high-pressure air is mixed with fuel and combusted. The high-temperature combusted air is then directed into the turbine section 18.

The turbine section 18 may include one or more turbines disposed in series along the axial direction. For example, in the illustrated embodiment, the turbine section 18 includes at least a high pressure turbine 32 and a low pressure turbine 33. As shown, each turbine 32, 33 may be configured to drive associated components of the engine 10 via concentrically disposed shafts or spools. The combusted air from the combustion section 16 expands through each turbine 32, 33, causing the turbine blades of each turbine to rotate. As shown, the turbines 32, 33 are mounted within a turbine case 34. The rotor blades in each turbine 32, 33 extend radially outward from its associated spool, and are surrounded by, and spaced apart from, an annular liner 35 that is attached to the turbine case 34. As the air flows through the turbine section 18, the air is then exhausted through the exhaust section 20, such as via a nozzle 36, which can combine with the bypass air to generate additional thrust.

As discussed above, during operation of the engine 10, the turbine case 34 thermally expands and contracts. This expansion and contraction, coupled with variations in turbine speed, result in variations in the radial clearance gaps between the turbine case liner 35 and the rotor blade tips of each turbine 32, 33. The radial clearance between the turbine blade tips and the annular liner affect the amount of air leakage past the rotor blades, which can affect turbine performance because turbine efficiency decreases as fluid leakage past the turbine blades increases.

To mitigate the effect of variations in the radial clearance between the turbine blades and turbine case liner, the exemplary turbine engine 10 employs an exemplary airflow control system 40, also referred to as a turbine case cooling system (TCC) or active clearance control (ACC) system, to maintain a desired gap between the rotating turbine rotor blade tips and the annular turbine case liner. As described in further detail below, the airflow control system 40 uses one or more air control valves 41 that are disposed between the engine bypass section 24 and the turbine case 34, and which are configured to selectively modulate the amount of bypass air that is allowed to cool the turbine case, which can thereby control the thermal expansion of the turbine case and hence the radial clearance with the turbine blade tips.

Figure 2:
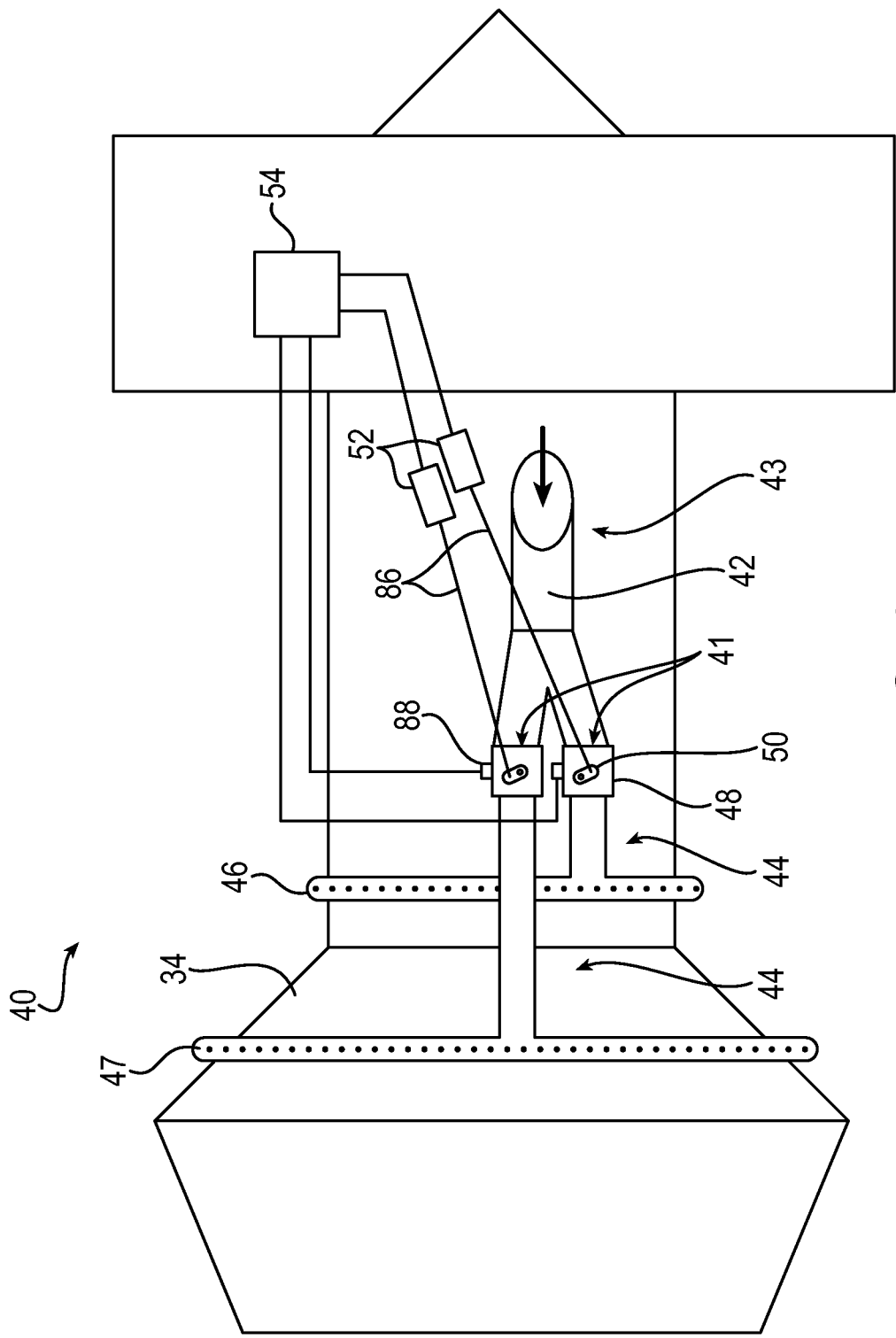
FIG. 2 is a schematic plan view of the airflow control system in FIG. 1.

Referring also to FIG. 2, a schematic plan view of the airflow control system 40 is shown in further detail. As shown, the airflow control system 40 includes an airflow supply passage 42 configured to convey air from the bypass section 24 (e.g., the annular flow passage between the engine cowl 28 and fan casing 26) to one or more regions of the turbine case 34. The airflow supply passage 42 has an upstream portion 43 in fluid communication with the bypass section 24, and a downstream portion 44 in fluid communication with the turbine section 18 to provide turbine case cooling. In exemplary embodiments, the airflow supply passage 42 may be coupled to or formed by the engine cowl 28, and is positioned in an annular space between the engine cowl 28 and the turbine case 34. In the illustrated embodiment, a plurality of manifolds, including at least a high pressure manifold 46 and a low pressure manifold 47, are also provided, which are used to direct cooling air that flows through the airflow supply passage 42 to at least the turbine case sections associated with the high pressure turbine 32 and low pressure turbine 33, respectively.

As shown, the air control valves 41 of the airflow control system 40 are disposed between the engine bypass section 24 and the turbine case 34 to control the amount of bypass air directed to the turbine case. In the illustrated embodiment, the airflow control system 40 includes two such air control valves 41 in each segment of the airflow supply passage for selectively controlling airflow to each of the high pressure manifold 46 and the low pressure manifold 47. As discussed in further detail below, each air control valve 41 includes a valve body having an upstream inlet opening in fluid communication with the upstream portion 43 of the supply passage 42 for receiving bypass airflow, and a downstream outlet opening in fluid communication with the downstream portion 44 of the supply passage 42 for delivering the airflow to the respective regions of the turbine case 34 via the high pressure manifold 46 and low pressure manifold 47. Also as discussed in further detail below, each control valve 41 has a valve body 48 with a fluid flow passage that defines at least a portion of the airflow supply passage 42, with a valve member 50 disposed in the valve body 48 for controlling the amount of airflow through the valve body. In this manner, each air control valve 41 is configured to modulate and control the amount of bypass air that is allowed to cool the turbine case 34.

The exemplary airflow control system 40 also may include one or more actuators 52 operatively coupled to the corresponding air control valves 41 for selectively controlling the position of the valve member 50 within the valve body 48. In this manner, the actuators 52 enable the system 40 to selectively control the flow of air through the air control valves 41 and modulate cooling. As shown, the airflow control system 40 also includes a controller 54, which is configured to control the actuator(s) 52 to select the desired flow position of the air control valve(s) 41.

Figure 3:
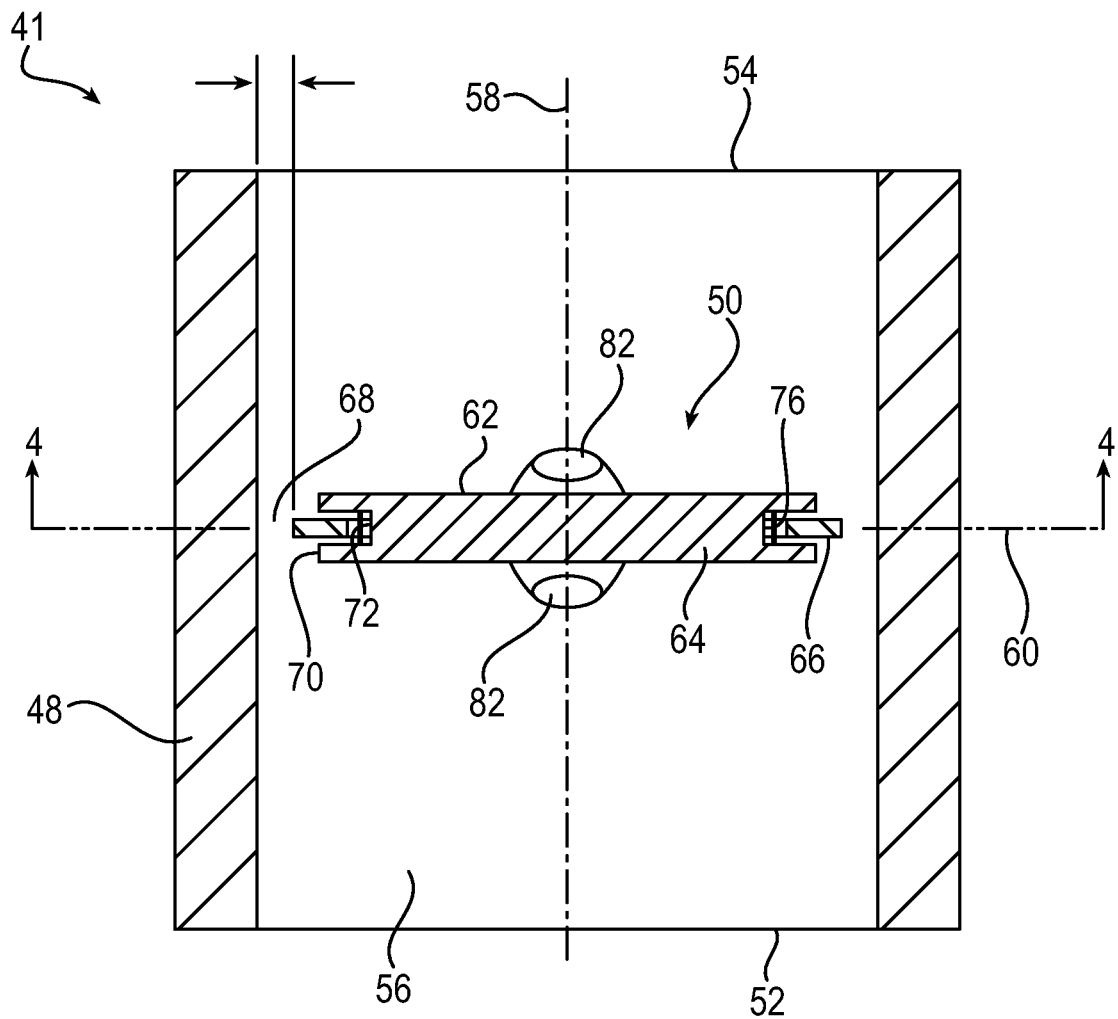
FIG. 3 is a cross-sectional side view of an exemplary turbine engine air control valve shown in an exemplary minimum flow position.
Figure 4:
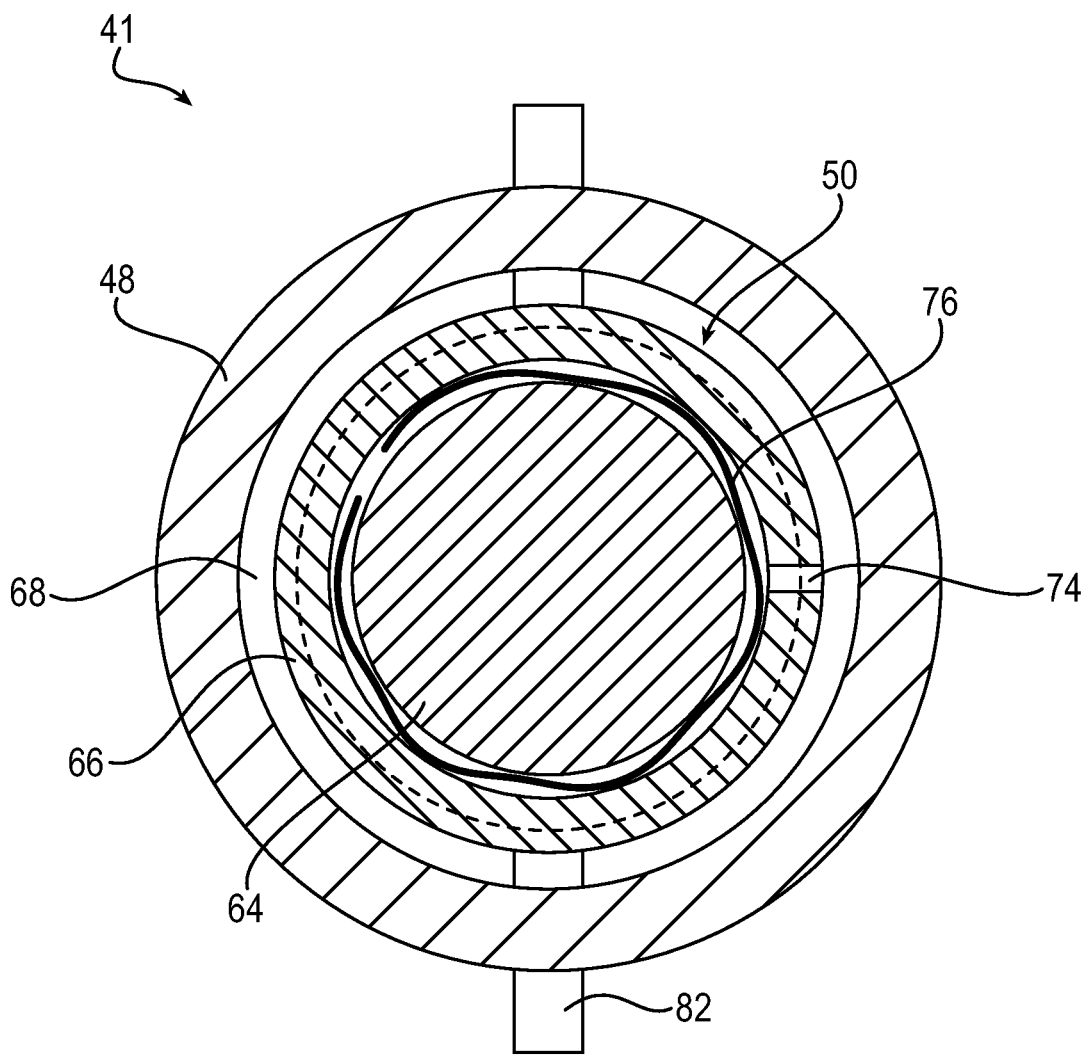
FIG. 4 is a cross-sectional top view of the air control valve taken along the line 4-4 in FIG. 3.
Figure 5:
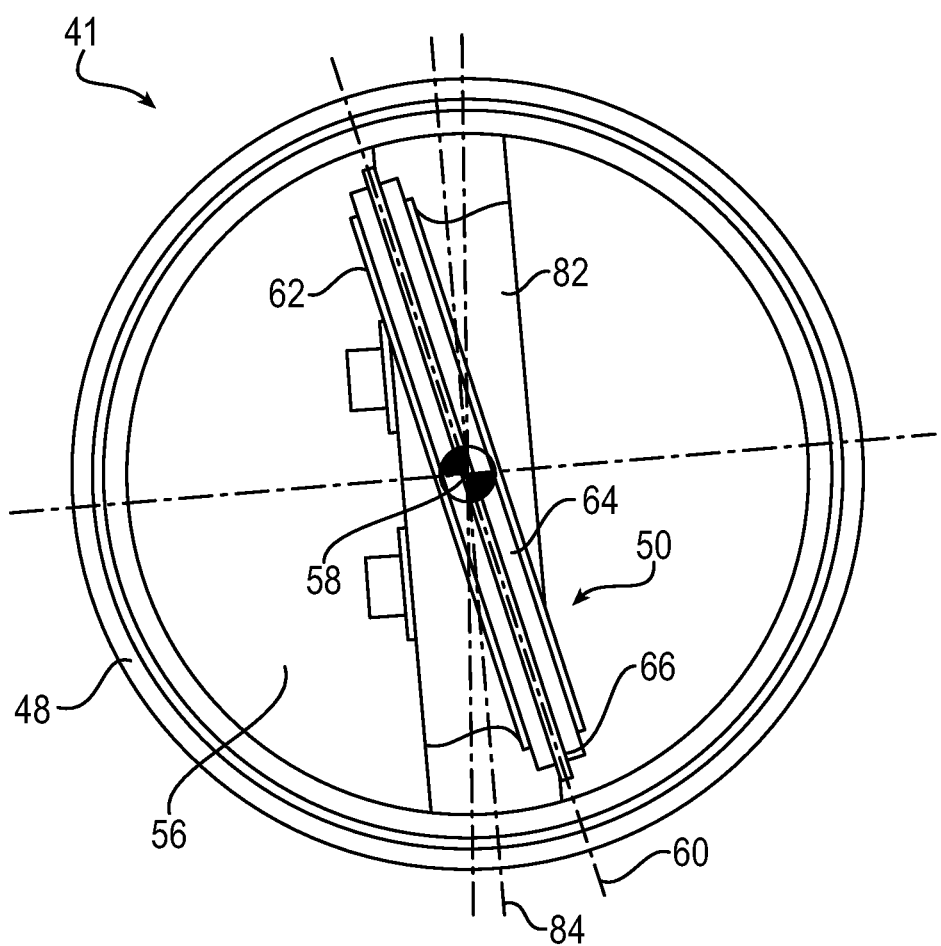
FIG. 5 is a top end view of the air control valve shown in an exemplary maximum flow position.

Referring to FIGS. 3-8, the exemplary air control valve 41 is shown in further detail. As shown, the air control valve 41 includes valve body 48 having an inlet opening 52, an outlet opening 54, and a fluid flow passage 56 that extends along a longitudinal axis 58 between the inlet and outlet openings. A valve member 50 is disposed in the valve body 48, and is configured to rotate about a rotation axis 60 between a maximum flow position and a minimum flow position. For example, in the illustrated embodiment, the valve member 50 is configured to rotate such that its major surface 62 extends toward a direction parallel to the longitudinal axis 58 in the maximum flow position (as shown in FIG. 5, for example); and the valve member 50 is rotated to extend toward a direction perpendicular to the longitudinal axis 58 in the minimum flow position (as shown in FIGS. 3 and 4, for example). The valve member 50 is also configured to rotate between different angular positions between the maximum flow position and the minimum flow position to modulate and control the flow of air through the fluid flow passage 56 based on an angular position of the valve member 50 relative to the valve body 48.

In the illustrated embodiment, the valve member 50 includes a vane 64 and a floating member 66 operatively coupled to the vane 64. As shown, the floating member 66 is configured to float relative to the vane 64, such that when the valve member 50 is in the minimum flow position (e.g., FIG. 3), the floating member 66 is spaced apart from the valve body 48 to form an annular flow gap 68 that provides a controlled amount of minimum fluid flow across the valve member 50 as the fluid flows through the annular flow gap 68. More particularly, as shown in the illustrated embodiment, when the major surface 62 of the vane 64 is perpendicular to the flow path through the valve body 48 (e.g., the minimum flow position, as shown in FIGS. 3 and 4, for example), the gap 68 formed by the floating member 66 establishes a controlled amount of minimum fluid flow across the valve member 50.

As discussed above, such a configuration of the valve member 50 that provides a controlled amount of minimum fluid flow in the minimum flow position solves problems associated with conventional air control valve designs that are configured to seal and eliminate flow in their minimum flow position. More particularly, as mentioned above, such conventional air control valves do not account for wear to engine components that can cause the radial gap between the rotor blade tips and the turbine case liner to increase over time. As such, the conventional air control valves that seal flow in the minimum flow condition may allow the worn turbine case to heat up and expand to cause a radial gap that is beyond an acceptable level, thereby causing engine inefficiency. In contrast, the exemplary air control valve 41 having the vane 64 with floating member 66 spaced apart from the valve body 48 in the minimum flow position provides a controlled amount of fluid flow that allows some cooling to the turbine case even when the valve member 50 is in the minimum flow position. This helps to maintain a suitable radial clearance gap between the rotor blades and turbine case liner, even in the event of wear between these components over the life of the engine.

Such a configuration of the floating member 66 also enables the valve member to provide a relatively small annular gap 68 without confining vane 64 position (e.g., allows for the vane 64 to be slightly off-centered). The floating member 66 can also be easily exchanged for a different sized floating member in order to adjust the desired amount of minimum flow at the minimum flow position. Beneficially, flow through the valve 41 at the minimum flow position can be fine-tuned at time of assembly. Additionally, conventional valves which do not allow flow at the minimum flow position can be retrofit with the vane 64 and floating disc 66 described herein with minimal hardware changes.

In exemplary embodiments, the vane 64 is configured as a disc-shaped plate. More particularly, as shown in the illustrated embodiment, the air control valve 41 is configured as a butterfly valve, and the vane 64 is configured as a butterfly plate. In the illustrated embodiment, the faces of the vane 64 are planar, but in alternative embodiments the faces of the vane 64 may have any suitable profile. For example, the face(s) of the vane 64 may be profiled, e.g. be contoured or have elements attached to the face. The profiling of the vane 64 may be such that the center of pressure of the valve 41 is positioned closer to a physical axis of the valve (e.g., the rotational axis 58 about which the valve member 50 rotates) during the highest load conditions during operation of the gas turbine engine.

In the illustrated embodiment, the vane 64 is circular and has a circumferential edge 70 having a circumferential slot or groove 72 within which the floating member 66 is disposed. More particularly, the floating member 66 may be configured as an annular ring (also referred to with reference numeral 66) disposed in the circumferential groove 72. In the illustrated embodiment, the floating member 66 is substantially annular and includes a small gap 74 that may be used to facilitate assembly of the annular ring 66 into the groove 72 of the vane 64. It is understood, however, that although the annular ring 66 includes the gap 74 in the illustrated embodiment, the gap 74 may be eliminated in other embodiments. In alternative embodiments, the annular ring 66 may include a plurality of discrete segments circumferentially disposed about the vane 64 within the groove 72. It is understood that although the vane 64 and floating member 66 are shown as being circular, other suitable shapes and configuration are possible as would be understood by those having ordinary skill in the art.

In exemplary embodiments, the valve member 50 may further include a resilient member 76 radially interposed between the floating member 66 and the vane 64. The resilient member 76 may be configured to engage the floating member 66 to restrict movement of the floating member relative to the vane 64. In the illustrated embodiment, the resilient member 76 is a centering spring that functions to center the floating member 66 relative to the vane 64, thereby maintaining a consistent annular space 68 between the floating member 66 and the valve body 48 when the valve member 50 is in the minimum flow position (e.g., FIG. 4). The resilient member 76 (e.g., spring) may be configured to nominally load the floating member 66 in the vane 64 to limit motion (e.g., reduce vibration). In exemplary embodiments, the resilient member 76 may be a wave spring, a marcel spring, or another suitable spring.

Figure 6:
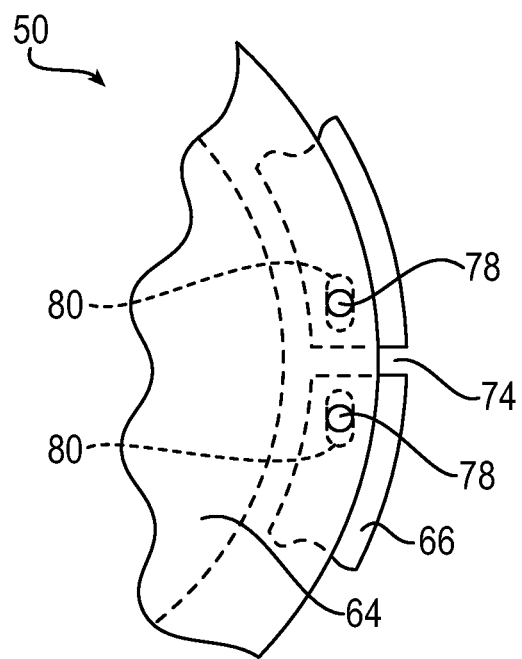
FIG. 6 is a partial top plan view of an exemplary valve member of the air control valve according to an embodiment of the invention.
Figure 7:
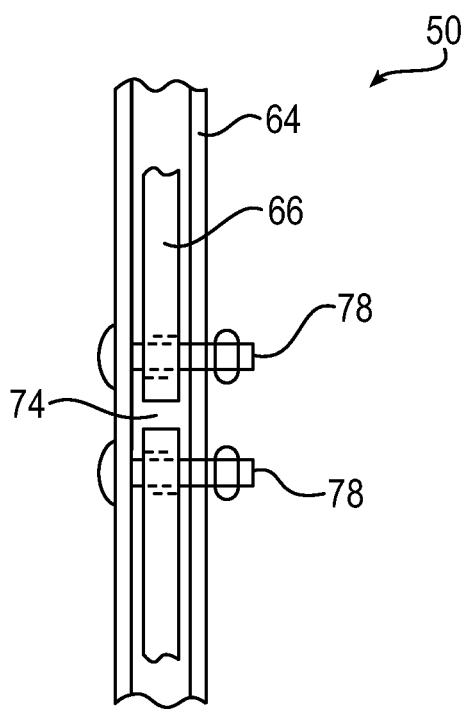
FIG. 7 is a partial side view of the valve member in FIG. 6.

Referring to FIGS. 6 and 7, the valve member 50 may further include one or more coupling members 78 that are configured to floatably couple the floating member 66 to the vane 64, such that the one or more coupling members 78 restrict radially outward movement of the floating member 66 to prevent the floating member from engaging the valve body 48. The coupling members 78 also may prevent the floating member 66 from being dislodged from the circumferential groove 72 of the vane 64. In the illustrated embodiment, the one or more coupling members 78 each includes a pin that extends through the vane 64 and into an elongated slot 80 of the floating member 66. As shown, the elongated slot 80 of the floating member 66 is circumferentially elongated to permit the floating member 66 to float relative to the vane 64. The coupling members 78 (e.g., pins) also may be configured to couple the floating member 66 to the vane 64 in a spaced apart radial and/or axial relationship. Alternatively or additionally, the coupling member(s) may include overlapping ends of the floating ring, such as a lock ring. It is understood that other suitable structures of the coupling members also could be employed, as would be understood by those having ordinary skill in the art.

Figure 8:
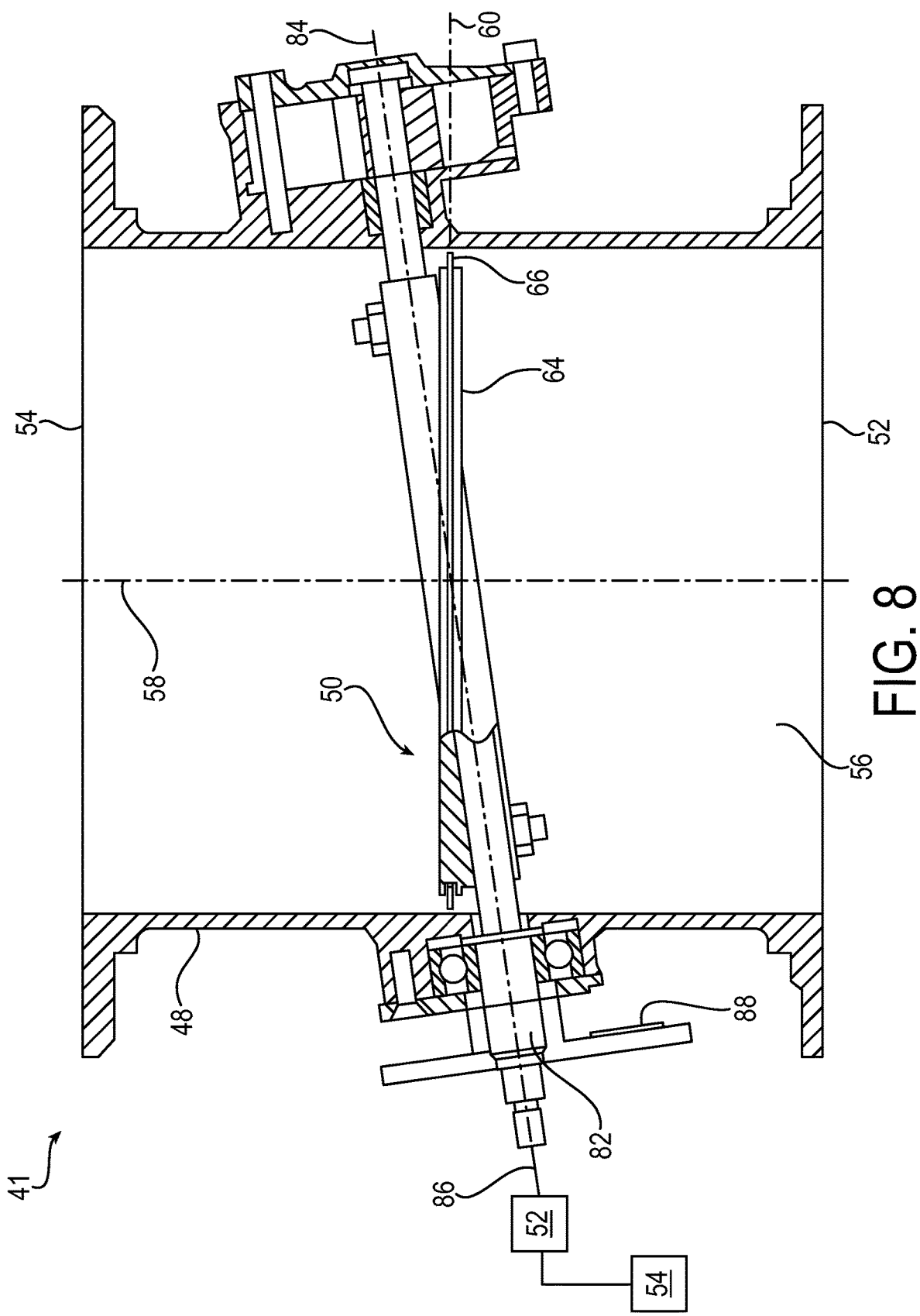
FIG. 8 is a cross-sectional front view of the air control valve in FIG. 3 showing an exemplary rotatable shaft.

Referring particularly to FIG. 8, the air control valve 41 further includes a rotatable shaft 82 extending through the valve body 48. As shown, the valve member 50 is secured to the rotatable shaft 82 so that rotation of the shaft 82 causes the valve member to rotate about the rotation axis 60 between the maximum flow position (e.g., FIG. 5) and the minimum flow position (e.g., FIGS. 3 and 8). In the illustrated embodiment, the rotatable shaft 82 is inclined to a plane perpendicular to the longitudinal axis 58 of the valve body 48, such that the rotatable shaft 82 is rotatable about a second axis 84 that is different from the rotational axis of the valve member. It is understood that such a configuration of the shaft 82 relative to the valve member 50 is exemplary in nature and other configurations are also possible.

As discussed with further reference to FIG. 2, the airflow control system may include at least one actuator 52 operatively coupled to the rotatable shaft 82 for selectively rotating the valve member 50 between the maximum and minimum flow positions. In exemplary embodiments, the actuator 52 may be a hydraulically operated device, or an electrically operated device, such as a linear or rotary actuator, for example. The actuator 52 may be operatively coupled to the valve member 50 (e.g., via the rotatable shaft 82) via suitable linkages 86, such as cables, or the like.

The airflow control system 40 may further include a position sensor 88 having an output signal associated with an angular position of the valve member 50 in the valve body 48. In exemplary embodiments, the position sensor 88 may be a rotary variable differential transformer that may be operatively coupled to a rotary vane actuator and/or the rotatable shaft 82 of the valve 41. The position sensor 88 may provide a volts/volt output signal related to the angular position of valve member. Some example embodiments may include a position sensor comprising a Hall effect sensor and/or a resolver.

The controller 54 may be a full authority digital engine control (FADEC). The controller 54 may be operatively coupled to the position sensor 88 and configured to receive the output signal from the position sensor. The controller 54 may be operatively coupled to the actuator 52 to cause rotation of rotation shaft 82 and/or the valve member 50, and/or to substantially maintain a desired angular position of the valve member 50. For example, under various operating conditions, the controller 54 may cause the actuator 52 to position and/or maintain the valve member 50 in the minimum flow position (e.g., to allow a controlled amount of minimum flow), the maximum flow position (e.g., fully open for maximum flow), and/or various intermediate positions between the minimum and maximum flow positions. In exemplary embodiments, a desired angular position of the valve member 50 may be determined by the controller 54 based at least in part upon at least one measured operating parameter, such as flow rate through the air control valve 41, for example.

It is understood that the particular conditions under which each air control valve 41 of the airflow control system 40 is in the maximum flow position or minimum flow position may vary depending on the particular engine design. For example, during some engine operational conditions, such as cruising, the respective turbine sections may need to be supplied with a minimum amount of cooling airflow to provide a suitable clearance gap between rotor blades and turbine case liner, in which case the air control valves associated with those turbine sections may be selectively activated to the minimum flow position, whereby the annular gap formed between the floating member and valve body may provide such minimum flow. Under other engine operational conditions, such as during take-off or maneuvering, a maximum amount of cooling air flow may need to be supplied to each turbine case section, in which case the air control valves associated with those turbine sections may be selectively activated to the maximum flow position in the manner described above.

It is understood that embodiments of the subject matter described in this disclosure can be implemented in combination with digital electronic circuitry, controllers, processors, computer software, firmware, and/or hardware. For example, embodiments may be implemented in an airflow control system that uses one or more modules of computer program with instructions encoded on a non-transitory computer-readable medium for execution by, or to control the operation of, data processing apparatus. The operations may include physical manipulations of physical quantities. Usually, though not necessarily, the physical quantities take the form of electrical or magnetic signals capable of being stored, transferred, combined, compared, and otherwise manipulated in a logic and the like.

It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of the foregoing. The controller may include all apparatus, devices, and machines for processing data, including by way of example a programmable processor, a computer, or multiple processors or computers.

The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random-access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

To provide for interaction with a user, embodiments may be implemented using a computer having a display device and an input device. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

In the discussion above and to follow, the terms "upper", "lower", "top", "bottom," "end," "inner," "left," "right," "above," "below," "horizontal," "vertical," and the like as used in this disclosure should be understood as referring to an arbitrary frame of reference, rather than to the ordinary gravitational frame of reference. This is done realizing that the air control valve, such as when used on vehicles, can be mounted on the top, bottom, or sides of other components, or can be inclined with respect to the vehicle chassis, or can be provided in various other positions.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. Moreover, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A turbine engine air control valve comprising:
    a valve body having a fluid flow passage;
    a valve member disposed in the valve body, the valve member being configured to rotate about a rotation axis between a maximum flow position and a minimum flow position;
    wherein the valve member includes a vane and a floating member operatively coupled to the vane; and
    wherein the floating member is configured to float relative to the vane and the floating member has an outer diameter which is less than an inner diameter of the fluid flow passage at the position of the floating member, such that when the valve member is in the minimum flow position, the floating member is spaced apart from the valve body to form an annular flow gap that provides a controlled amount of minimum fluid flow across the valve member as the fluid flows through the annular flow gap.

2. The air control valve according to claim 1, wherein the vane is configured as a disc-shaped plate.

3. The air control valve according to claim 1, wherein the control valve is configured as a butterfly valve and the vane is configured as a butterfly plate.

4. The air control valve according to claim 1, wherein the vane has a circumferential edge having a circumferential groove, and the floating member includes an annular ring disposed in the circumferential groove.

5. The air control valve according to claim 4, wherein the annular ring is continuous, or includes a split, or includes a plurality of discrete segments circumferentially disposed about the vane.

6. The air control valve according to claim 1, wherein the valve member further comprises a resilient member radially interposed between the floating member and the vane, the resilient member being configured to engage the floating member to restrict movement of the floating member relative to the vane.

7. The air control valve according to claim 6, wherein the resilient member is a centering spring.

8. The air control valve according to claim 1, wherein the valve member further comprises one or more coupling members configured to floatably couple the floating member to the vane, wherein the one or more coupling members are configured to restrict radially outward movement of the floating member to prevent the floating member from engaging the valve body.

9. The air control valve according to claim 8, wherein the one or more coupling members each include a pin extending through the vane and into an elongated slot of the floating member.

10. The air control valve according to claim 9, wherein the elongated slot of the floating member is radially or circumferentially elongated.

11. The air control valve according to claim 1, wherein the valve member is configured to modulate the flow of air through the fluid flow passage based on an angular position of the valve member within the flow passage.

12. The air control valve according to claim 11,
wherein the fluid flow passage extends along a longitudinal axis;
wherein the valve member is rotated to extend toward a direction parallel to the longitudinal axis in the maximum flow position; and
wherein the valve member is rotated to extend toward a direction perpendicular to the longitudinal axis in the minimum flow position.

13. The air control valve according to claim 1, wherein the control valve further comprises a rotatable shaft extending through the valve body;
wherein the valve member is secured to the rotatable shaft so that rotation of the shaft causes the valve member to rotate about the rotation axis between the maximum flow position and the minimum flow position.

14. The air control valve according to claim 13,
wherein the rotatable shaft is rotatable about a shaft axis that is inclined to a plane perpendicular to a longitudinal axis of the valve body, and
wherein the valve member has a major surface that extends along a plane that is inclined relative to the shaft axis.

15. An airflow control system for a gas turbine engine comprising:
an airflow supply passage configured to convey air therethrough;
a butterfly valve operatively disposed in the airflow supply passage, the butterfly valve comprising:
a valve body having a fluid flow passage that defines at least a portion of the airflow supply passage;
a rotatable shaft extending through the valve body;
a valve member disposed in the valve body and secured to the rotatable shaft such that rotation of the shaft causes the valve member to rotate about a rotation axis between a maximum flow position and a minimum flow position;
wherein the valve member includes a vane and a floating member operatively coupled to the vane; and
wherein the floating member is configured to float relative to the vane and the floating member has an outer diameter which is less than an inner diameter of the fluid flow passage at the position of the floating member, such that when the valve member is in the minimum flow position, the floating member is spaced apart from the valve body to form an annular flow gap that provides a controlled amount of minimum fluid flow across the valve member as the fluid flows through the annular flow gap;
the airflow control system further comprising an actuator operatively coupled to the rotatable shaft for selectively rotating the valve member between the maximum and minimum flow positions.

16. The airflow control system according to claim 15, wherein the airflow control system further comprises:
a position sensor having an output signal associated with an angular position of the valve member in the valve body; and
a controller operatively coupled to the position sensor and to the actuator;
wherein the controller is configured to receive the output signal from the position sensor and is configured to control the actuator to rotate the rotatable shaft and thereby the valve member to a selected position between the maximum and minimum flow positions.

17. The airflow control system according to claim 15,
wherein the valve body has an upstream inlet opening and a downstream outlet opening, the valve member being disposed in the valve body between the inlet and outlet openings;
wherein the airflow supply passage has an upstream portion upstream of the inlet opening of the valve body, the upstream portion being in fluid communication with a bypass flow passage of an aircraft engine; and
wherein the airflow supply passage has a downstream portion downstream of the outlet opening of the valve body, the downstream portion being in fluid communication with a turbine section of the aircraft engine.

18. A butterfly valve comprising:
a valve body having a fluid flow passage;
a valve member disposed in the valve body, the valve member being configured to rotate about a rotation axis between a maximum flow position and a minimum flow position;
wherein the valve member includes a vane and a floating member operatively coupled to the vane, wherein the vane has a circumferential edge having a circumferential groove, and the floating member includes an annular ring disposed in the circumferential groove; and
wherein the floating member is configured to float relative to the vane and the floating member has an outer diameter which is less than an inner diameter of the fluid flow passage at the position of the floating member, such that when the valve member is in the minimum flow position, the floating member is spaced apart from the valve body to form an annular flow gap that provides a controlled amount of minimum fluid flow across the valve member as the fluid flows through the annular flow gap.

* * * * *